United States Patent
Erlichman et al.

[19]

[11] Patent Number: 5,913,809
[45] Date of Patent: Jun. 22, 1999

[54] OZONE GENERATORS USEFUL IN PROMOTING COMPLETE COMBUSTION

[76] Inventors: Alexander Erlichman, 1607 N. Hoover St., Los Angeles, Calif. 90027; Vadim Skulkin, 6562 Skeltondale Ave., West Hills, Calif. 91307

[21] Appl. No.: 08/966,714

[22] Filed: Nov. 10, 1997

Related U.S. Application Data

[63] Continuation-in-part of application No. 08/954,447, Oct. 20, 1997.

[51] Int. Cl.$^6$ ..................................................... F01N 3/02
[52] U.S. Cl. ............................................. 60/272; 60/275
[58] Field of Search ........................... 60/272, 273, 274, 60/275, 282, 283, 293, 304, 307

[56] References Cited

U.S. PATENT DOCUMENTS

| | | | |
|---|---|---|---|
| 4,069,665 | 1/1978 | Bolasny | 60/275 |
| 4,195,606 | 4/1980 | Wallis et al. | 60/275 |
| 5,050,377 | 9/1991 | Eng | 60/275 |
| 5,546,747 | 8/1996 | Colletta et al. | 60/275 |

*Primary Examiner*—Marguerite McMahon
*Attorney, Agent, or Firm*—J. Michael Bak-Boychuk

[57] ABSTRACT

An ionization field is produced across the pumped air flow to a fuel combustion process to increase the content of oxygen in the stream, and the stream reactivity. This ionization field may be produced between a sharp electrode and a grid or sheet, positioned in a shielded structure like the filter housing on the engine intake. Alternatively, an ultraviolet light source may be used to ionize the oxygen in the air stream. In either form the air stream may be compressed before its ionization and then may be injected into the exhaust products of the combustion process. The ionization power may be modulated along with the demand. Thus the throttleposition may be sensed to modulate the voltage multiplier levels across the electrodes straddling the air stream, in accordance with the demand.

6 Claims, 4 Drawing Sheets

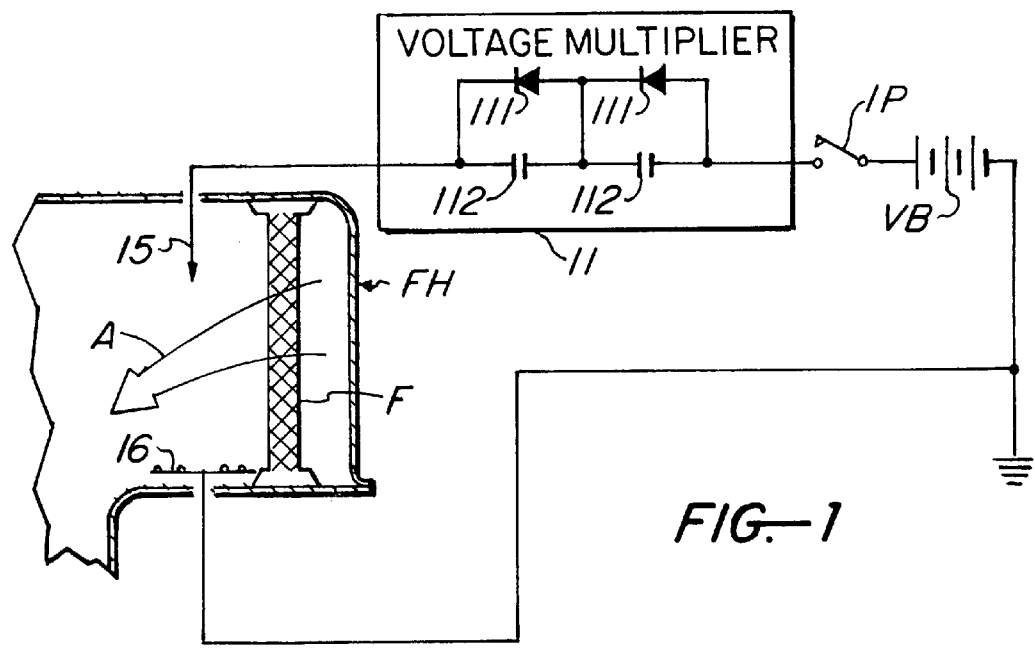
FIG.—1
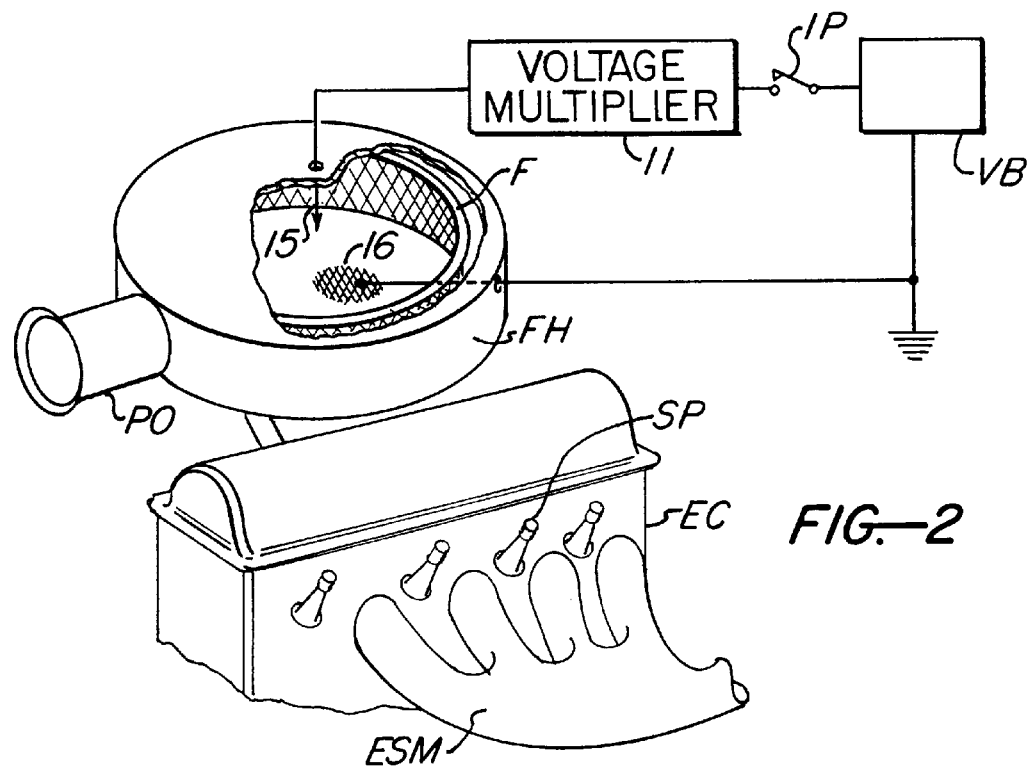
FIG.—2

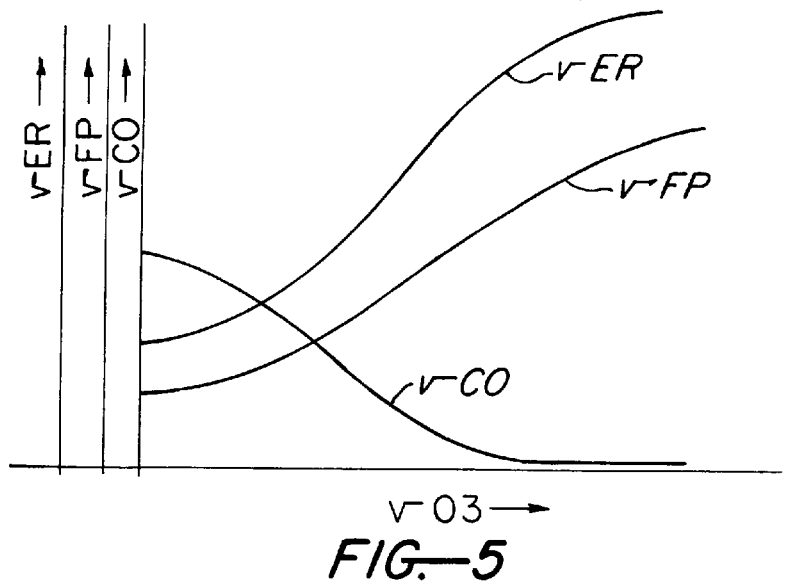
FIG.—5
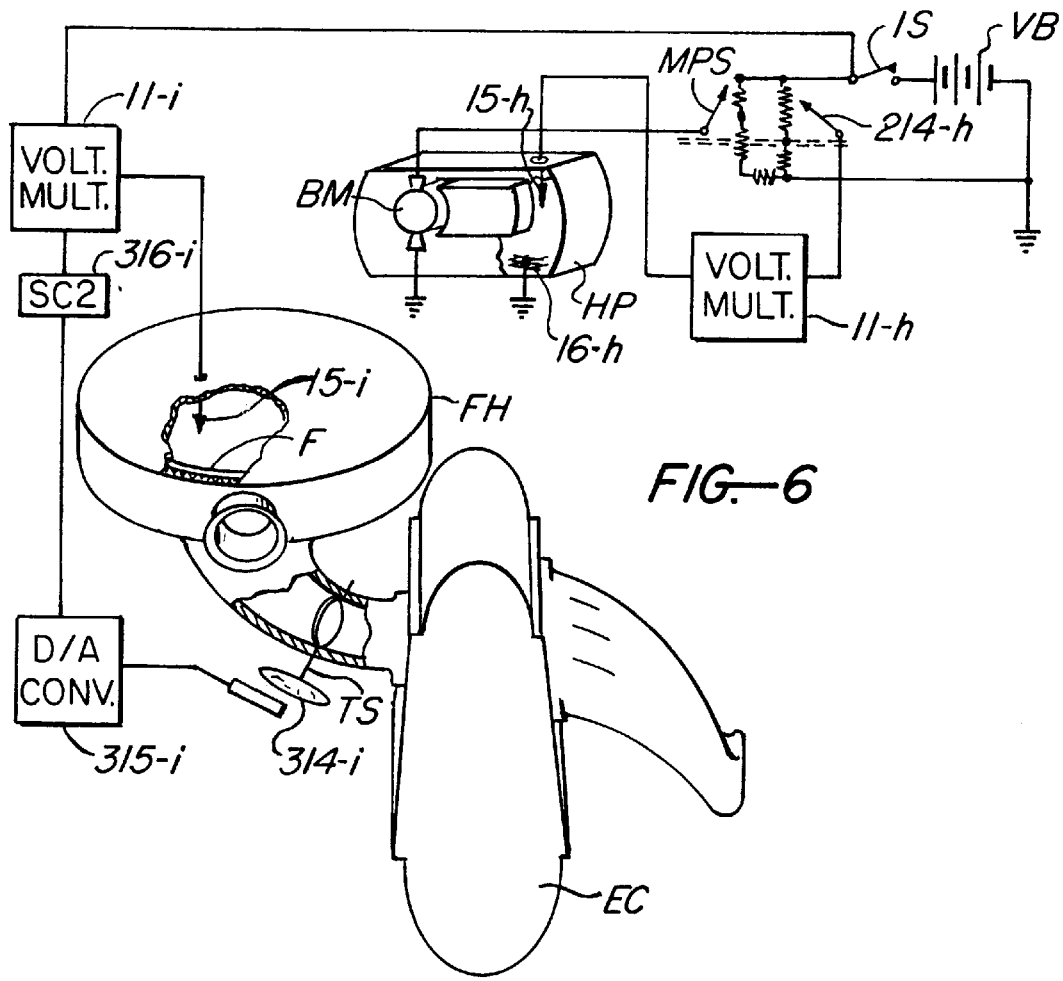
FIG.—6

OZONE GENERATORS USEFUL IN PROMOTING COMPLETE COMBUSTION

REFERENCE TO RELATED APPLICATIONS

This application is a continuation-in-part of U.S. patent application Ser. No. 08/954,447 filed on Oct. 20, 1997, and now pending. Claim is made to this earlier filing date for all matter included herein that is common with this parent application.

BACKGROUND OF THE INVENTION

1. Field of the Invention

The present invention relates to combustion product reduction devices, and more particularly to air ionization structures useful to produce ozone into the inlet of an internal combustion engine.

2. Description of the Prior Art

In its simplest expression the power output of a fossil fuel engine depends on the total mass flow of the reagents of combustion. Since the reaction typically includes one reagent carried as fuel, in the form of a liquid, such as gasolene, diesel fuel or other hydrocarbon derivative (including propane, natural gas, methanol products, and the like) it is the delivery of the other reagent, air, that forms the constraint on the stochiometric mass of the reagents. Accordingly, devices for enhancing the mass intake of ambient air into an internal combustion engine have had extensive development attention in the past.

Thus, for example, turbine driven compressors [turbochargers], shaft-driven compressors [superchargers], intake geometry, and other, similar techniques have been developed in the past, all with the purpose to increase the intake volume or mass. At the same time fuel delivery systems have been improved, including various forms of injection arrangements for maximum power.

Along with these developments, techniques have been devised to introduce catalyst traces into the intake flow such as those described in U.S. Pat. No. 5,312,566 to Carroll, et al and U.S. Pat. No. 4,475,483 to Robinson. While suitable for the purposes intended each of the foregoing examples introduces a further consumable, like diluted platinum chloride in the Carroll patent, to the combustion process along with the inherent replenishment tasks. Moreover, catalytic fractioning of the hydrocarbon molecule, while an effective mechanism for increasing the specific energy output of the fuel, fails to correct the typical deficit of the atmospheric reagent and the consequent emissions of incomplete combustion products. As result the primary concern today is over the quality of the exhaust, particularly focused by the excessive emission like carbon monoxide [CO], nitrous oxide [NOX], and hydrocarbon products [HC], and the several known combinations thereof.

Thus it is the concern over oxygen starved or incomplete reactions that is at the center of current focus. These reactions, in a typical internal combustion engine, depend on two effects, one determined by the air volume delivered and the second by the breakdown potential across the terminals of a spark plug. Of further significance, however, is the current practice of feeding airborne oxygen into the exhaust stream as a technique for reducing the unwanted emission of unburnt combustion reagents. Like the combustion process itself, these reagents in the exhaust stream benefit from promoted oxidation.

Combustion of exhaust gases or fuel in any closed cavity involves several combined effects. A correct balance of reagents needs to exist in the chamber, mixed with sufficient vigor to produce full combustion within the time interval defined by the gas exchange, otherwise referred to as flame front propagation, that is reliably ignited. Of these effects the latter two depend greatly on the state of ionization of the mixed gases, and pre-ionizing the air stream improves both these effects.

More importantly, ionizing the oxygen portion of the air stream results in ozone products [O3], increasing the mass density of the oxygen in the stream. Thus in limited physics ozone will increase the mass of oxygen available for combustion. Thus ionization of the intake air obtains a variety of desired effects, and convenient ionization techniques are extensively sought. It is one such technique that is disclosed herein.

SUMMARY OF THE INVENTION

Accordingly, it is the general purpose and object of the present invention to provide an ionizing electrical field in the air flow to an powerplant combustion process.

Other objects of the invention are to provide an ionizing electrical field along the air stream received in a combustion process.

Further objects of the invention are to provide an ionizing electrical field formed between a coductive grid and a metal structure of a combustion process, aligned to form a charged passage along the air stream conveyed thereto.

Yet further objects of the invention are to provide an ionizing field structure defined by a pointed conductor aligned towards the metal elements along the intake of an internal combustion engine.

Briefly, these and other objects are accomplished in accordance of a first embodiment of the present invention by providing a voltage multiplier circuit tied to the battery of a motor vehicle, the multiplied voltage output thereof then connected to a pointed electrode directed towards a conductive surface forming the other side of the circuit. This electrode arrangement is then aligned along the intake air flow to an internal combustion engine, e.g., at the air filter housing, providing a point emission of electrons or "blitzableiter" effect to ionize the incoming air.

In an alternative implementation the voltage multiplier may be connected to excite an ultra-violet [uv] light source shielded inside a segment of the intake manifold and selected to produce the frequencyspectrum at which oxygen in the air stream is ionized.

A further alternative electrode structure may take the form of conductive grid, either at the forward opening of the engine bay or at the intake of the filter housing, through which the air is drawn into the engine. Each of the foregoing embodiments result in ionization of the air, producing ozone [O3] in the air stream. The increased ion level then improves the flame propagation within the chamber, the break down across the spark plug gap, and the total mass flow of the oxygen in the air stream. In consequence, the performance of the powerplant is greatly improved.

These various electrode forms may also be used to condition incoming heater air and may be modulated in the rate of ozone production along with the power demands of the engine. Accordingly, two or more ionization circuits may be provided, each at a power rate selected by power controls that are coordinated with the air demands. Thus, for example, the throttle shaft of the engine may be provided with an encoder that selects the ionization rate in accordance with the inlet air flow rate, and the heater fan power setting may be similarly used to modulate the ozone production rates in the heater plenum.

The same mechanisms for ionizing an air stream are also useful for oxidizing the exhaust gases. Thus in a yet further implementation the air is compressed, then passed in its compressed state through an ionizing passage, to be thereafter injected into the exhaust stream. The presence of the highly reactive ozone in this injected stream will promote oxidation of whatever exhaust products that have not been completely combined in the engine process, thereby further reducing the exhaust products of a fuel burning system. This particular aspect is useful also in stationary power plants, and also in combustion processes of incineration and the like.

BRIEF DESCRIPTION OF THE DRAWINGS

FIG. 1 is a diagrammatic illustration of a circuit useful in developing ionization potential across adjacent electrodes;

FIG. 2 is a perspective illustration separated by parts of a first embodiment of the present invention, conformed for point emission of electrons to effect ionization;

FIG. 5 is a graphic illustration of combustion efficiency with increasing ionization level;

FIG. 6 is yet another diagrammatic illustration, in perspective, of the present invention conformed to ionize the air in the heater plenum and in the engine intake in accordance with the respective flow rates;

DESCRIPTION OF THE PREFERRED EMBODIMENTS

Figure 3:
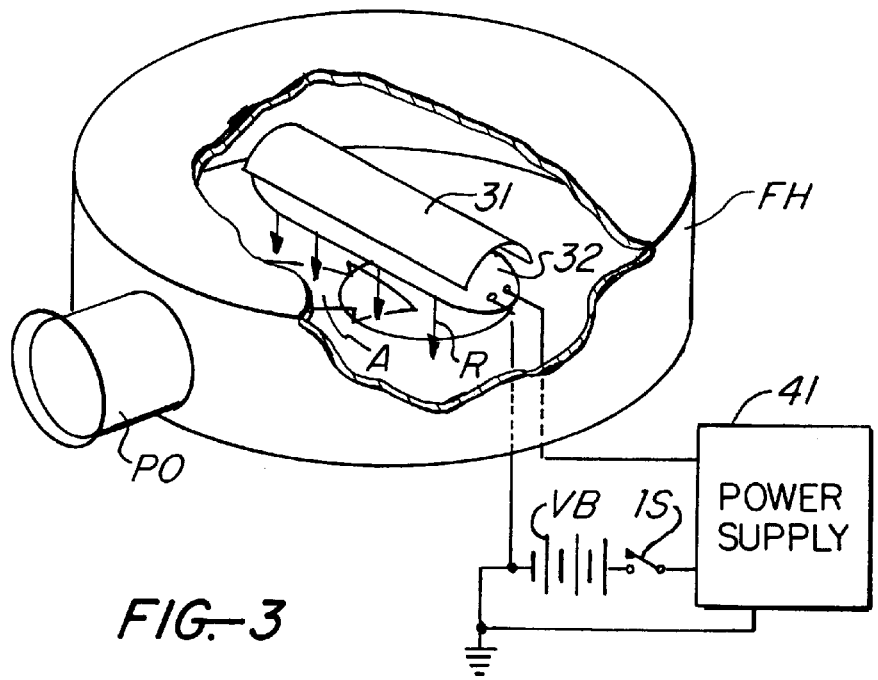
FIG. 3 is yet another perspective illustration, separated by parts, illustrating a second embodiment of the present invention, conformed to effect ionization of the intake air by ultraviolet illumination.

As shown in FIGS. 1 and 2 the inventive ionization assembly, generally designated by the numeral 10, comprises a voltage multiplier 11 connected between a car battery VB and ground G. The output of multiplier 11 is then tied to a set of electrodes, one formed as a point electron source 15 and the other defined as an opposed surface 16, preferrably forming a part of the inlet structure of the internal combustion engine EC of a motor vehicle MV. In preferred implementation electrodes 15 and 16 are deployed in the air filter housing FH of the engine EC and are therefore exposed to the air flow therethrough. Voltage multiplier 11, in turn, may be formed as a half wave diode multiplier of five (5) kilovolt or greater operating capacity, implemented by a set of diodes 111 each bridging a corresponding capacitor 112, in a circuit connected across the ignition points IP of the engine EC. Thus the operation of the inventive inlet air ionizer is directly associated with the operation of the engine EC. Moreover, the produced ozone is confined to the interior of the filter housing FH, behind filter F, and is therefore effectively contained in this enclosure. Accordingly, the release of any residual corrosive ozone is confined within structures that form the typical motor vehicle, and little further structure is required.

Those in the art will appreciate that molecular oxygen [O2] is converted to its second allotrope ozone [O3] in the presence of electric discharge. This discharge is referred to as the "dark, quiet discharge" since the current transmission is without any associated perceptible effects, depending primarily on the 13.6 eV first ionization potential of this element. The resulting molecule is a nonlinear molecule represented by the resonant formula

with a strong odor characteristically associated with thunderstorms. In this form it is highly reactive and therefore an effective reagent with hydrocarbons.

More importantly, the ozone molecule is 50 percent higher in molecular weight over molecular oxygen. At the same inlet pressures and temperatures this increase in molecular weight will reduce the partial pressure of this element, increasing its content in the flow. As result, the quantity of the ingested air borne reagent, oxygen, is increased, assisting in complete combustion. Furthermore, the unstable and highly reactive nature of ozone both assists in the flame propagation inside the combustion chamber and promotes arcing across the spark plug SP.

An alternative implementation is illustrated in FIG. 3, wherein like functioning parts are designated by like numbers and reference is solicited to the description thereof that is preceding. In this example a shielded chamber 31 is formed in the filter housing FH in which an ultraviolet radiation source 32 is positioned. Preferrably chamber 31 forms a part of the intake structure, behind filter F, and is formed as an elongate conduit with the source 32 equally of elongate form positioned along one side thereof. The air flow A therefore will be exposed to the ultraviolet radiation R produced by the source, splitting the oxygen [O2] molecule into atomic oxygen [O] which then combines with other molecular oxygen to form ozone in accordance with the following relationships:

(1) O2+uv=2O;

and (2) O2+O=O3

A power supply 41 is further provided to excite source 32, connected to the vehicle battery VB through the ignition switch IS. In this form the production of the corrosive ozone is once again confined to the inlet structure behind the filter F, and the operation similarly is limited to the ignition intervals of the motor vehicle MV.

Figure 4:
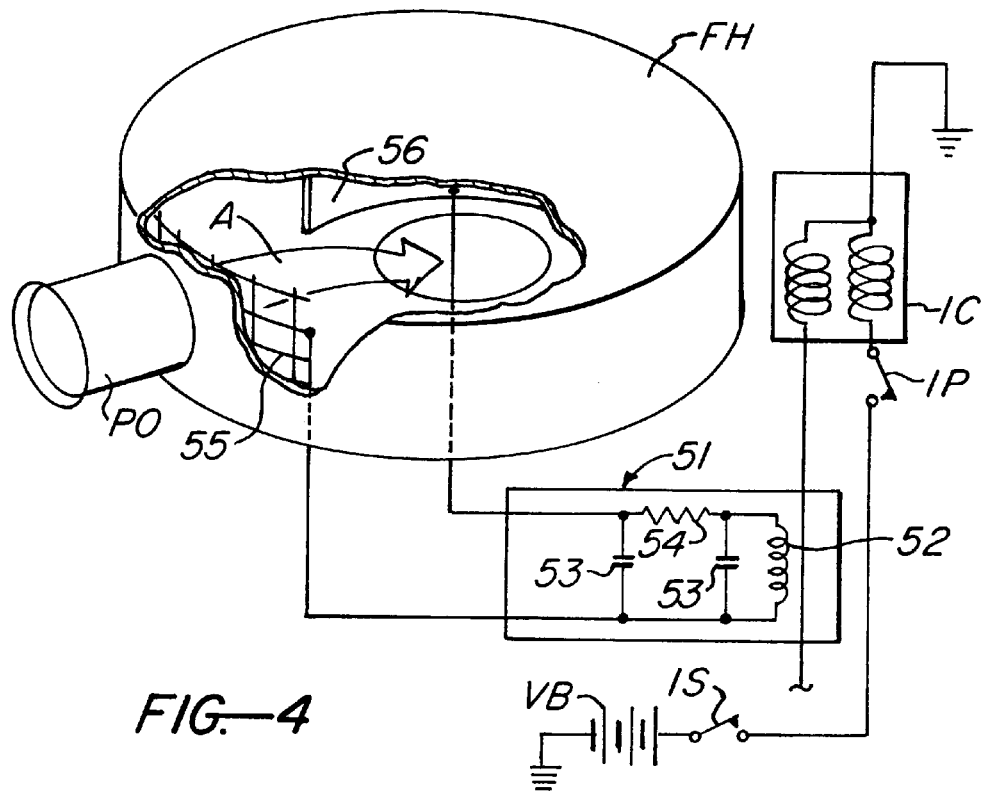
FIG. 4 is a further illustration in perspective detail, illustrating a third alternative for effecting ionization of intake air.

In the third alternative, illustrated with particular reference in FIG. 4, and in which like numbered parts function in a manner like that earlier described, a coductive grid 55 is utilized in place and in stead of the point source electrode 15. Grid 55 may be positioned across an inlet port PO of the filter housing FH adjacent an oppositely charged surface or panel 56. While there are various manners for exciting the grid 55 and panel 56, in the present example an induction coil 52 may be affixed to the high tension lead HTL from an automotive ignition coil IC. The output terminals of the induction pick-up 52 may be bridged by appropriate noise filtering capacitors 53, and may include further filtering resistance 54. In this form an alternating voltage signal generator, generally at 51, is connected across the grid 55 and plate 56 to develop the necessary electric potential for ionization. Once again, the resulting ozone product is confined within the filter housing, and its generation is limited to the operative states of the power plant.

By reference to FIG. 5, those skilled in the art will note that the production of carbon monoxide [CO], shown as variable vCO is inversely related to the presence of ozone [O3] in the inlet air stream, shown as variable vO3. Flame propagation rate, and energy released, shown as variables vFP and vER, in turn vary with the content of ozone. Thus substantial benefits can be obtained by the foregoing modifications.

A further implementation of the foregoing principles is illustrated in FIG. 6, in which the beneficial effects of ozone as an air purifier are also used to condition the passenger air. Thus two applications for the general functions are effected, both requiring ionizing power in quantities that vary with demand. As previously referred, like numbered parts function in like manner, and in those instances where duplication of parts is effected to accomodate the two separate functions, those ascribed to air ionization in the heater plenum HP are assigned a suffix h, and those functioning in the engine intake are suffixed by the symbol i. Those in the art will appreciate that a typical automobile is provided with an air exchange system for conditioning the air, including a heater plenum chamber HP through which ait is drawn by a blower motor BM. In typical practice a multi-position switch MPS is provided in the passenger compartment by which the power level to the motor BM is selected. A second switch 214-*h* is ganged to switch MPS, connecting through voltage divisions the power from battery VB to one voltage multiplier 11-*h*. In a manner previously described multiplier 11 provides the ionization power to the discharge terminal 15-*h* inserted into the plenum HP.

At the same time, a shaft encoder 314-*i* may be mounted onto the throttle shaft TS in the engine intake, to modulate through a D to A converter 315-*i* the power from the battery VB to an SCR 316-*i* which then drives the balance of the multiplier elements 111 and 112. The power then delivered to the electron source 15-*i* in the air filter housing FH is thus modulated by the throttle demand. In this manner an optimal ionization level is maintained at substantially all levels of use.

Those in the art will appreciate that the illustration in FIG. 6 is exemplary only. Ionization sources like the ultra-violet source 32 may be similarly modulated in power output and plates and grids 55 and 56 may be substituted for the above electron source. Thus the instant teachings may be variously combined to effect in a simple and expedient manner the benefits of ozone production.

Those in the art will further appreciate that the foregoing teachings are useful with engines both of the ignition type and also self-igniting engine cycles, like diesel power plants. In each instance the introduction of the O3 molecule into the stream both increases the chemical reactivity and the total amount of oxygen available for combustion. Thus the diesel compression ratio may be somewhat reduced, particularly as a function of engine wear, and ignition along with the expansion of the charge may be compensated by the ionized oxygen molecule.

Figure 7:
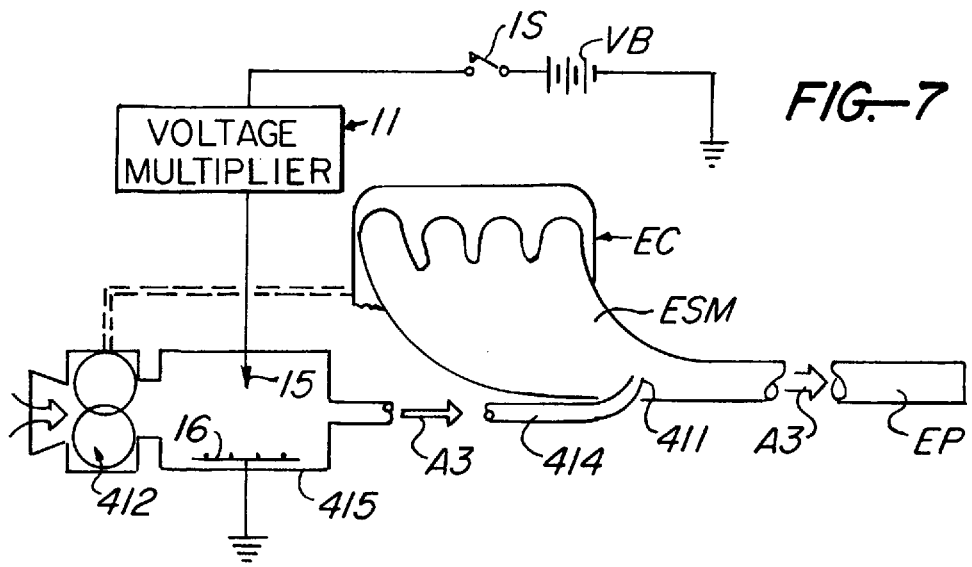
FIG. 7 is a diagrammatic illustration of an exhaust injecting arrangement introducing ionized air into the exhaust stream.

In addition, the O3 molecule may be injected into the exhaust stream itself. Thus as shown in FIG. 7 an automobile exhaust system manifold ESM may be provided with an injector 411 receiving compressed air A3 from an engine driven compressor pump 412 and conveyed through a conduit 414. Conduit 414 may include an enlarged ionizing chamber 415 provided with the above described electrodes 15 and 16, once again electrically connected across the voltage multiplier 11. Thus the exhaust gases passing out of the manifold ESM into the exhaust pipe EP are augmented with ionized air, or ozone, promoting further reactions with any unburnt products of reaction. Of course the power for the compressor 412 and the ionization process may again be derived from the engine EC and the charge of the vehicle battery VB. Accordingly, the ionization of air described herein may be also useful in reducing exhaust pollution.

Those skilled in the art will appreciate that the above teachings may be variously combined and the output of multiplier 11 may be modified with demand, as in the shaft encoder 314-*i* and D to A converter 315-*i*. Thus the amount of ozone introduced into the exhaust stream may be modulated with demand.

Figure 8:
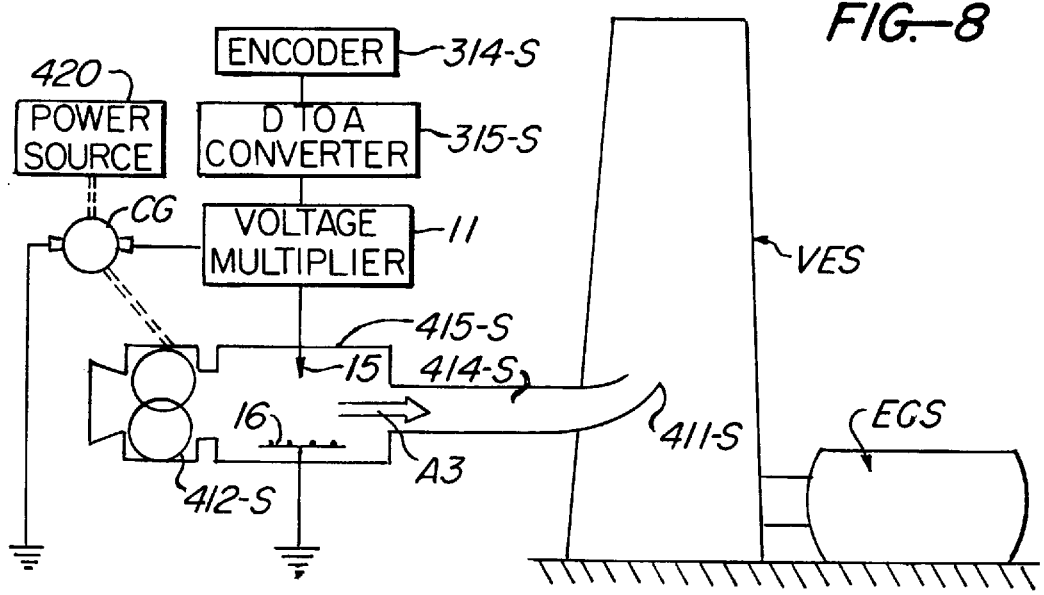
FIG. 8 is a detail illustration of the inventive process in a stationary application.

Similar considerations may be applied to stationary combustion systems, like those shown by the example illustrated in FIG. 8. In this example a stationary combustion source ECS exhausts the products of combustion into a vertical exhaust stack VES into which compressed and ionized air A3 is once again injected through an injector 411-*s*. A power source 420 then drives the compressor pump 412-*s* and a conventional generator CG to excite the multiplier 11. As in the previous example, the air is conveyed through an ionization chamber 415-*s* between the electrodes 15 and 16. Thus the process herein described is useful in various applications both at the intake and in the exhaust.

Thus the several examples illustrated above may be combined in various arrangements, all to improve the combustion efficiency of any combustion process. At the same time the foregoing principles may be utilised to condition the air stream used by human consumers, thus improving both the consumption efficiency of the power plant and the ambient surroundings.

Obviously many modifications and variations of the foregoing teachings may be made without departing from the spirit of the present invention. It is therefore intended that the scope of this invention be determined solely by the claims appended hereto.

We claim:

1. In a combustion process characterized by a combustion chamber conformed to combine hydrocarbon fuel with oxygen in the ambient atmospheric air, said combustion process including fuel delivery means, a platform for supporting thereof, intake means for mixing said air with said fuel and conveying same to said chamber, and an exhaust for releasing the products of combustion from said chamberpath of said air, the improvement comprising:

a source of electrical power;

a compressor pump conformed to compress ambient air into a conveyance conduit, said conduit including an enlarged cavity;

a voltage multiplier connected to said source of electrical power and conformed to multiply the voltage signal thereof relative to a ground potential to a level greater than the ionization potential of oxygen;

an ionization field producing means deployed in said enlarged cavity and connected to receive said ionizing voltage signal for ionizing the air conveyed by said compressor pump in accordance with said voltage signal; and injection means conformed to receive said ionized and compressed air and to inject same into said exhaust.

2. Apparatus according to claim 1, wherein:

said ionization field producing means in said enlarged cavity includes a first electrode formed as a generally conical cantelevered conductor aligned towards a second electrode formed as a generally planar conductor grid aligned substantially orthogonally to the axis of the first electrode.

3. Apparatus according to claim 2, wherein:

said ionization field producing means in said enlarged cavity includes a source of ultraviolet light aligned to illuminate the air conveyed from said compressor pump.

4. A method for oxidising the exhaust products of a combustion process comprising the steps of:

pumping ambient air into a closed conveyance chamber;

conveying said pumped air into an ionizing field formed in said closed conveyance chamber, for ionization thereof in said field; and injecting said pumped and ionized air into said exhaust products of combustion.

5. A method according to claim 4, further comprising the steps of:

directing said products of combustion and said injected ionized and compressed air into an exhaust structure.

6. A method according to claim 5 wherein:

said step of directing said products includes the step of releasing thereof through a vertical stack.

* * * * *